United States Patent Office 2,891,921
Patented June 23, 1959

2,891,921
STABILIZATION OF POLYTETRAFLUORO-ETHYLENE FILLER SLURRIES

Miles Charles Kumnick and John Frank Lontz, Wilmington, Del., assignors to E. I. du Pont de Nemours and Company, Wilmington, Del., a corporation of Delaware No Drawing. Application September 22, 1955
Serial No. 536,032

6 Claims. (Cl. 260—29.6)

This invention relates to aqueous slurries of polytetrafluoroethylene and inert fillers, and more particularly to the stabilization of such slurries during transportation and storage.

Polytetrafluoroethylene is a polymer of outstanding mechanical, electrical and chemical properties. The extreme inertness of the polymer to chemical attack and the excellent resistance to heat and coldness have given rise to many valuable applications of the polymer. For certain applications it was found that the physical properties of polytetrafluoroethylene could be further improved by the addition of inert inorganic fillers such as carbon, silica, or asbestos, particularly by inert inorganic fillers in anisometric form. Filled compositions of such nature are particularly useful in fabricated form as gaskets, mechanical bearings and seals, and electrical insulation. To obtain optimum properties of filled compositions it is important to have a uniform distribution of the filler in the polymer. Such uniform distributions are obtained by the use of finely-divided filler and an aqueous dispersion of the polymer. The aqueous polymer dispersion is admixed with the filler and agitated to disperse the filler in the aqueous polymer suspensoid. The colloidal polymer is then coagulated onto the filler and results in a uniform mass of polymer and filler. The preparation of aqueous suspensoids of polytetrafluoroethylene is described in U.S. Patent 2,559,752 among others. Methods for coagulating aqueous dispersions of polytetrafluoroethylene have been described in U.S. Patent 2,593,583 and in copending application U.S. Serial No. 446,395, filed July 28, 1954.

The aqueous slurry obtained on coagulating the polymer onto the inorganic filler is well suited for the preparation of sheeting by paper-making techniques, and is particularly advantageous where the filler is in an anisometric shape. It was found, however, that the slurry containing the uniform mixture of polymer and filler is sensitive to agitation, which will cause a separation of polymer and filler, and that, unless care is taken to avoid agitation of the slurry, a stratified non-uniform product is obtained. Agitation such as will cause a separation of the filler and polymer in the slurry can be readily avoided in small scale sheeting machines, but is avoided only with great difficulty and expense in large scale continuous sheet-making equipment. An additional disadvantage of prior art fabricating techniques is the incomplete exhaustion of the dispersed polymer onto the fiber. The incomplete exhaustion, resulting in loss of polymer, increases the cost of preparing filled compositions from aqueous dispersions of polytetrafluoroethylene.

It is therefore the objective of the present invention to stabilize aqueous polytetrafluoroethylene-filler slurries against separation of the polymer from the filler and against redispersion of the polymer. It is a further object of the present invention to improve the physical properties of filled compositions of polytetrafluoroethylene. Another objective is to improve the process of preparing sheets made from filled compositions of polytetrafluoroethylene. Other objects will become apparent hereinafter.

The objects of the present invention are accomplished by the addition of ionic surface-active agents to aqueous slurries of polytetrafluoroethylene resin and inorganic fillers after the coagulation of tetrafluoroethylene polymer dispersion onto the inorganic filler. It has now been discovered that aqueous slurries of polytetrafluoroethylene and inorganic fillers, particularly those in fibrous or laminar form, can be stabilized against separation of polymer and filler and redispersion of the polymer by the addition of ionic surface-active agents. It was furthermore found that the addition of the ionic surface-active agents results in the complete exhaustion of the polymer onto the filler. The critical step in the process of the present invention is the addition of the ionic surface-active agents after the coagulation of the polymer dispersion onto the inorganic filler. Addition of the ionic surface-active agents prior to the coagulation of the aqueous polymer dispersion will not give the desired stabilization of the polymer-filler slurry.

The effectiveness of the ionic surface-active agents in the process of the present invention depends on their ionic charge and the affinity of the hydrocarbon chain for the polytetrafluoroethylene particle. It was found that the surface-active agents which are highly dissociated when dissolved in water and which contain aliphatic hydrocarbon radicals having from 10 to 20 carbon atoms, are outstanding stabilizing agents for aqueous slurries of polytetrafluoroethylene-inorganic filler mixtures. The preferred ionic surface-active agents are sodium salts of fatty alcohol sulfates and, in particular, the sodium salt of lauryl alcohol sulfate. The preferred cationic surface-active agents are such compounds as stearyl dimethyl benzyl ammonium chloride. Non-ionic surface-active agents are not useful in the present invention since they tend to cause a redispersion of the coagulated polymer.

The quantities in which the ionic surface-active agents of the present invention are added to the slurries of polytetrafluoroethylene and filler depend on the type of aqueous polymer dispersion used as well as the type of the filler used. Polymer dispersions having high concentrations of polymer dispersing agents, generally non-ionic surface-active agents, require the addition of larger quantities of the ionic surface-active agent after coagulation. The quantity of ionic surface-active agent should be increased as the surface area of the inorganic filler becomes smaller, since it is more difficult to coagulate the polymer onto a filler with a small surface area. In general, the quantity of the ionic surface-active agent added after coagulation of the polytetrafluoroethylene onto the filler will vary from 0.5 to 10% by weight of the polymer present. A preferred quantity to be added is 2% by weight of the polymer.

The polytetrafluoroethylene dispersions which are employed are preferably adjusted to at least about 10% solids prior to introduction of the filler. In the process of this invention it is not necessary to remove dispersing agents from the aqueous polymer dispersion to obtain complete exhaustion. The filler may be added in a dry state and dispersed through mild agitation in the aqueous polymer dispersion, but is preferably added in a suspended aqueous form. The mixture of the filler and dispersed polymer is coagulated by the addition of strong electrolytes such as aluminum sulfate, which cause the polymer to coagulate onto the filler and will lead to the formation of the polymer filler slurry. To this slurry the surface-active agents of the present invention are added with mild agitation. The slurry is made into mats and sheets using conventional paper-making equipment. This technique is particularly useful where the filler is of a fibrous or laminar nature. The mats are dried and sintered by heating above the 327° C. transition temperature of the polymer to effect consolidation and finally cooled under pressure to form a dense sheeting which provides an outstanding gasket material.

The process of the present invention is further illustrated by the following examples. Unless otherwise stated, all parts are by weight.

*Example I*

To 7500 parts of water was added under mild agitation 54 parts of "Fiberfrax" (a mineral fiber prepared by blowing a molten stream of a mixture of alumina and silica) until a suspension was obtained. To this suspension was added 470 parts of an aqueous dispersion of polytetrafluoroethylene containing 81 parts of polymer and one part of Triton X–100, an alkyl aryl polyether alcohol non-ionic surface active agent, defined as "polyethylene glycol p-octyl phenol ether" in U.S. Patent 2,820,752. The mild agitation was continued until a homogeneous mixture was obtained. The polymer was coagulated onto the fibrous filler by the addition of 425 parts of a 1% solution of aluminum sulfate. Agitation was continued throughout the addition of the aluminum sulfate. To the resulting slurry was then added 1.6 parts of "Duponol" ME, a commercially-available sodium salt of lauryl alcohol sulfate. The slurry was agitated for 10 minutes at 400 r.p.m. after the addition of "Duponol" ME to simulate agitation occurring in commercial fabricating equipment. The slurry was diluted two times with water and was then pumped onto a fine mesh screen to form a mat using conventional paper-making techniques. The water obtained from the screen contained no dispersed polytetrafluoroethylene, thus indicating complete exhaustion. The wet mat was dried at 120° C. for approximately 4 hours, compressed at 1000 lbs./sq. in. and then sintered in an oven at 390° C. for one hour. While still above the 327° C. transition of the polymer, the mat was removed to a press where it was cooled under a pressure of 1000 lbs./sq. in. in order to obtain a high density, compact sheeting. The sheeting made from the stabilized slurry shows marked improvement in uniformity as well as electrical and mechanical properties as indicated by the following tabulation, which shows a comparison with sheeting made by an identical procedure without the addition of the surface-active agent to the slurry:

|  | No Additive to Slurry | Sodium Salt of Lauryl Alcohol Sulfate Added |
|---|---|---|
| Surface | Rough | Smooth. |
| Homogeneity | Stratification of polymer and filler. | Homogeneous. |
| Density | 2.0 | 2.2 |
| Dielectric strength (ASTM-D 149-44) | 250–300 volts | 480–550 volts. |
| Tensile properties (ASTM-modified D-638) | 840 lb./sq. in. | 1,880 lb./sq. in. |

The effect of the added stabilizer was further demonstrated by permitting the agitated diluted slurry containing the mixture of polytetrafluoroethylene and "Fiberfrax" to stand for a period of 48 hours. In that period, as shown by the table below, the slurry containing no "Duponol" ME had almost completely separated, the non-water-wet polymer having risen to the surface.

|  | No Additive to Slurry | Sodium Salt of Lauryl Alcohol Sulfate Added |
|---|---|---|
| Clarity of supernatant | Slightly cloudy | Colorless. |
| Polymer redispersed or not coagulated | 2+ | None. |
| Polymer separated from the coagulated mixture | 98+ | None. |

*Example II*

To 2000 parts of water were added 40 parts of mica flakes passing a 40 mesh screen. To this slurry was added under mild agitation 334 parts of an aqueous dispersion of polytetrafluoroethylene which contained 120 parts of polymer and 1.5 parts of Triton X–100, an alkyl aryl polyether alcohol non-ionic dispersing agent. Mild agitation was continued until a homogeneous mixture was obtained and 90 parts of a 10% aqueous solution of aluminum sulfate was added. The mixture under mild agitation was then heated to 70° C. to coagulate the polymer onto the mica platelets. The resulting slurry was cooled to room temperature and 2.4 parts of Triton X–400 (a 25% aqueous dispersion of stearyl dimethyl benzyl ammonium chloride) dissolved in 20 parts of water was added under rapid agitation. The slurry was then diluted with 8000 parts of water and a mat was formed on a conventional laboratory paper-making machine in which the "Teflon" mica mixture is collected on a 100 mesh screen. The water obtained from the screen contained no polymer, thus indicating complete exhaustion. The mat was dried at 120° C., sintered at 385° C., and cooled under a pressure of 500 lbs./sq. in. The resulting mat was free of polymer aggregates and of better uniformity than a mat produced without the addition of Triton X–400. The same results were obtained when "Duponol" ME was used as the stabilizing agent.

*Example III*

To 2000 parts of water was added 54 parts of short asbestos fibers and 246 parts of an aqueous dispersion of polytetrafluoroethylene which contained 81 parts of polymer and 1.0 part of Triton X–100. The mixture was gently agitated until homogeneous and 90 parts of a 10% aqueous solution was added. The mixture was then heated to 70° C. under continued mild agitation, thereby coagulating the polytetrafluoroethylene onto the asbestos fiber. The slurry was cooled to room temperature and 1.62 parts of "Duponol" ME was added. The mixture was then violently agitated for 15 minutes to simulate agitation occurring in commercial fabricating equipment. The slurry was then diluted and made into a dense smooth mat as described in the preceding examples. Again the polymer was completely exhausted from the slurry.

On comparison with a product made without the use of the "Duponol" ME, a more uniform sheet with improved electrical and mechanical properties was obtained by using the ionic surface-active agent.

The process of the invention is equally applicable to such other fillers or extenders as glass fibers, carbon black, coke flour, clay and other inert materials, onto which polytetrafluoroethylene can be coagulated and with which it is desirable to have stabilized slurries of the polymer and filler. Slurries of polymer and inert organic filler, although preferably made by coagulating an aqueous dispersion of polytetrafluoroethylene onto the dispersed filler, may also be made mechanically comminuting solid polytetrafluoroethylene and then admixing the finely-divided polymer with the filler. The process of the present invention is equally applicable to polytetrafluoroethylene filler slurry prepared by methods other than coagulation.

The products so prepared are thereby improved in quality for a variety of applications. These include gasket stock for high temperature corrosive services wherein the inert polytetrafluoroethylene is augmented by increased resistance to deformation by compression; mechanical seals and bearings wherein fillers provide the reinforcing matrix; and electrical insulators for use at high temperatures wherein the resin component furnishes the required dielectric characteristics while the filler furnishes the rigidity and as in the case with mica, asbestos, and glass, also the dielectric quality of its own.

We claim:

1. In the process of preparing mixtures of inorganic filler and polytetrafluoroethylene wherein an aqueous dispersion of polytetrafluoroethylene containing as a dispersing agent a non-ionic surface-active agent is coagulated by the addition of an electrolyte onto an inorganic co-dispersed filler of the class consisting of silica and carbon, to form an aqueous slurry of said polytetrafluoroethylene and filler, the step which comprises adding, after the said coagulation of the polytetrafluoroethylene, from 0.5 to 10% by weight of the polytetrafluoroethylene of an ionic surface-active agent of the class consisting of the sodium salt of lauryl alcohol sulfate and stearyl dimethyl benzyl ammonium chloride to said slurry, whereby an improved composition of inorganic filler and polytetrafluoroethylene is obtained.

2. The process as set forth in claim 1 wherein the inorganic filler is in an anisometric form.

3. The process as set forth in claim 1 wherein the inorganic filler is in fibrous form.

4. The process as set forth in claim 1 wherein the inorganic filler is in laminar form.

5. The process as set forth in claim 1 wherein the ionic surface-active agent is the sodium salt of lauryl alcohol sulfate.

6. The process as set forth in claim 1 wherein the ionic surface-active agent is stearyl dimethyl benzy ammonium chloride.

References Cited in the file of this patent

UNITED STATES PATENTS

| | | |
|---|---|---|
| 2,343,095 | Smith | Feb. 29, 1944 |
| 2,478,229 | Berry | Aug. 9, 1949 |
| 2,613,193 | Osdal | Oct. 7, 1952 |

UNITED STATES PATENT OFFICE

CERTIFICATE OF CORRECTION

Patent No. 2,891,921                                              June 23, 1959

Miles Charles Kumnick et al.

It is hereby certified that error appears in the printed specification of the above numbered patent requiring correction and that the said Letters Patent should read as corrected below.

Column 3, second table, under the heading "No Additive to Slurry", second line thereof, for "2+" read -- 2% --; third line thereof, for "98+" read -- 98% --.

Signed and sealed this 27th day of October 1959.

(SEAL)
Attest:

KARL H. AXLINE
Attesting Officer

ROBERT C. WATSON
Commissioner of Patents